Figure 4:
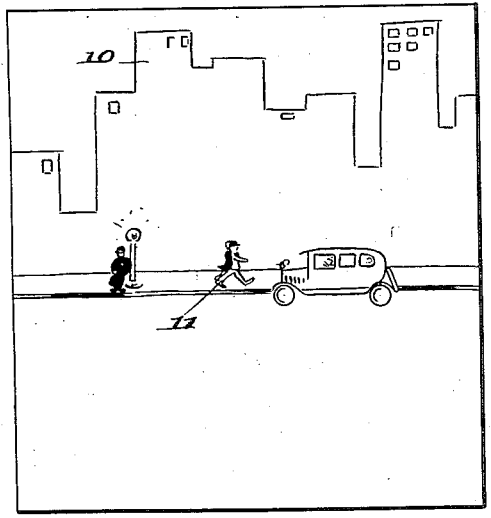

Oct. 4, 1932.  D. C. HODGKIN  1,880,202
ADVERTISING DEVICE AND METHOD OF MAKING THE SAME
Filed Oct. 5, 1928  2 Sheets-Sheet 1
Fig. 2.
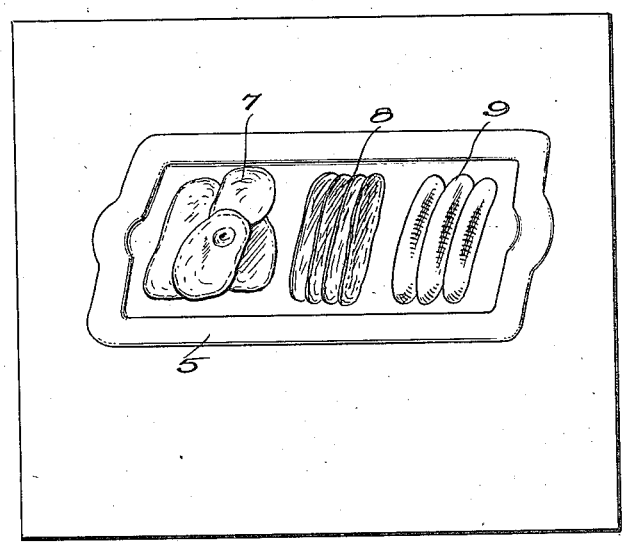
Fig. 3.
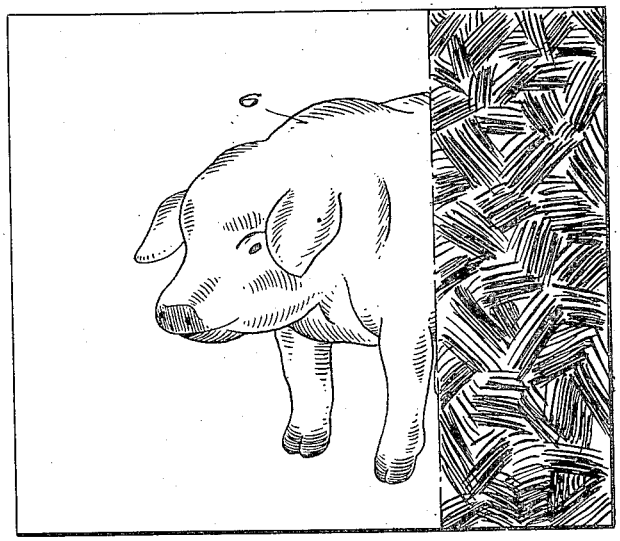
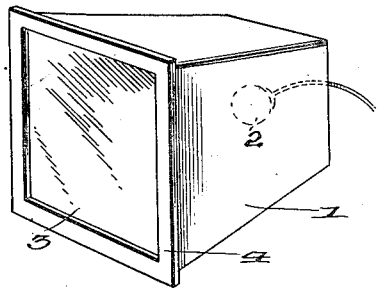
Fig. 1.
Inventor
Dunkin C. Hodgkin
By Vernon R. Hodges
Attorney Patented Oct. 4, 1932

1,880,202

UNITED STATES PATENT OFFICE

DURBIN C. HODGKIN, OF WASHINGTON, DISTRICT OF COLUMBIA, ASSIGNOR OF ONE-HALF TO TOM B. OWENS, OF FORT WORTH, TEXAS

ADVERTISING DEVICE AND METHOD OF MAKING THE SAME

Application filed October 5, 1928. Serial No. 310,582.

This invention relates to an improvement in advertising devices and methods of making the same.

The object of the invention is to provide novel and attractive advertisements of an unusual character for the purpose of attracting attention and fixing in the mind of the person viewing the advertisement the object thereof.

It is possible to paint on the front of a translucent or transparent surface, a varied number of colors and shades depicting a picture, scene or the like, to be viewed by reflected light and on the reverse side of the surface, to paint a varied number of colors in brilliant hues and brush strokes of a very thin and sharp variety so that when the rays of transmitted white light are subjected thereto a dazzling kaleidoscopic effect is created, thereby destroying entirely any form or image of the colors which had been painted on the front. It is also possible to paint directly over this kaleidoscopic effect on the back of the display surface, an entirely new form or image which will appear thoroughly defined in its entirety when subjected to the rays of transmitted white light.

It is also possible to paint an object or scene in varied transparent colors on the front side of a transparent or translucent surface and to paint on the back of the same surface and directly behind the said object or scene the complements of the colors used on the front. For instance, if the colors on the front were yellow, orange and red, I would place behind the yellow portion of the image a purplish tone of transparent color, behind the orange a blue-green tone of transparent color and behind the red a straight green tone of transparent color. When viewed by the rays of transmitted light the entire scene or object would then become a neutral grey-brown tone, and upon this neutral grey-brown tone could be painted a new scene or object in entirely different colors which when viewed by transmitted light would show in their entirety and not be lost in any manner. For instance, a sunset scene with pink, yellow, orange and red clouds and streaks running laterally can be greyed out by complementary colors and a sunburst scene with stripes of color running in angles from a central sun will present a most striking change when viewed alternately by the rays of reflected and transmitted light. This sunburst is only used in a descriptive sense because colors on the blue end of the spectrum can be made to appear, by this process, distinctly and vividly through the colors of the red end of the spectrum without the colors of the red end of the spectrum being visible at all when viewed by transmitted light.

An object or scene may also be painted in transparent colors on the front of a transparent or transclucent surface and if on the back of the same translucent surface a series of broad brush strokes made in transparent color in a variegated form, known to the art world as mottled, whether these brush strokes be of darker hue or shade or of the same hue or shade, when viewed by transmitted light the entire front object or scene will be obliterated and invisible.

The foregoing three principles of obliteration or fade-out not only apply to a complete object or scene but naturally to any portion thereof which it is desired to eliminate.

In the accompanying drawings:

Fig. 1 is a perspective view of the sign casing;

Figs. 2 and 3 are front and rear views of a sign, embodying the present invention; and Figs. 4 and 5, and 6 and 7 are similar views of different signs embodying the invention.

The casing illustrated in Fig. 1 is designated generally by the numeral 1, being provided with a lamp 2 arranged therein for transmitting rays of light from the rear through the sign 3. This light 2 may be flashed or alternately switched off and on in any well known manner as by the use of thermostatic or other flasher switches. The sign 3 is carried by a frame 4 which may be removable from the casing 1 to facilitate changing of the sign. Lights may be arranged in front of the sign 3 or the front may be illuminated by day-light as found desirable. However it is to be understood that the use of the term "transmitted light"

or its equivalent refers to the light transmitted from the lamp 2, from the back of the sign, while "reflected light" refers to the illumination from the front. It is also understood that the advertisement may be printed, drawn, or otherwise applied to the sign 3, and while it is referred to throughout this specification as being painted thereon, this is merely for purposes of illustration.

In Fig. 2, I show a plate containing cold cuts of pork, bacon, sausage and the like. In Fig. 3, I show the picture of a hog. By the alternate flashing of the lights behind the translucent surface, first the plate 5 and its contents will appear and then the hog 6 will appear, and the plate and contents disappear. This is accomplished by a kaleidoscopic effect.

The plate and its contents are painted in natural colors, for instance the rim of the plate in a blue design, the cold cuts 7 in brownish red, whites, yellows and pinks; the bacon 8 in its natural color and the sausage 9 in its natural reddish brown on the front of the translucent surface. On the back of the translucent surface a number of vivid colors will be used without regard to design or form, in sharp thin, brush strokes, close together, and without regard to any particular arrangement of the colors, except that they be vivid. When the transmitted rays of white light are subjected to the picture in this condition, from behind the surface, all the human eye can perceive is kaleidoscopic effect of variegated color, brilliant and scintillating, but no form is visible. This is accomplished by the refraction of light rays against the sharp brush strokes at such a speed and with such color reflections that the original form is destroyed. In Fig. 3, we show the hog which is now painted in his ordinary red brown color upon the back of the kaleidoscopic brush strokes and because of the intensity of the neutral tone, of red brown, or a greyed black, or sand color, all of the kaleidoscopic colors are lost and the hog in his entirety with appropriate shadows, etc., is visible when subjected to the transmitted rays of white light. In this picture the plate is so arranged that no portion of it extends beyond the hog's body, thereby all of the absorption or obliteration takes place without the necessity of interfering with the background.

Figure 5:
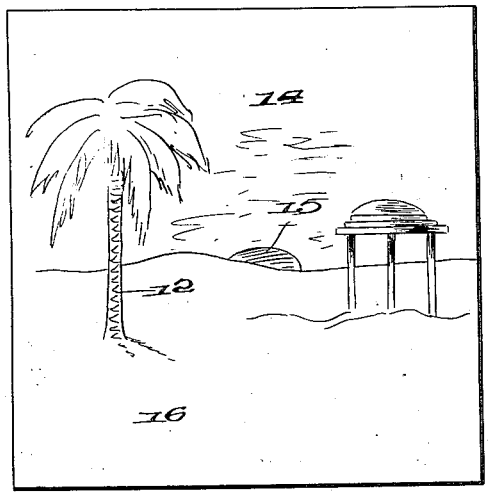

In Fig. 4, I show the sky line of a city with its buildings 10 and pedestrians 11 and its traffic painted in their natural colors with a blue sky. In Fig. 5, I show an oriental desert scene, with date tree 12, red sky 14, yellow sun 15 and sand colored foreground 16. By the use of my discovery of bringing colors through their complements I am able to make Fig. 4 disappear entirely and Fig. 5 appear when subjected to the transmitted rays of white light. Having painted Fig. 4 on the front side of the translucent surface in natural colors of grays and browns, and vivid hues, for pedestrians, etc., I then on the back side make each of the colors a neutral grey by applying directly behind the color, either its complement, or some color capable of creating grey, such as if the sky were blue I use a combination of red orange which would give me a brownish gray effect when subjected to the transmitted rays of white light. The buildings 10 being in either whites or browns, or such other colors as may be desired, and being naturally dimmed when subjected to the transmitted rays of white light, are greyed down to about the same shade as the sky. The street, the pedestrians, the automobiles, will be treated likewise by using complements behind the front colors or such other colors as may produce a neutral grey in harmony with the buildings and the sky. This picture, when subjected to the transmitted rays of white light will present a dull tonal grey appearance without any form or image being visible.

It is then possible to paint on the back of this grey, the date tree with a very dark brown trunk, vivid chrome green leaves, and by placing yellow and yellow green in the foreground we have changed the city street to sand with its appropriate shadows. By painting the sky a vivid red with the sun a brilliant yellow with such other appropriate design as may be desired, such as mosques, etc., and subjecting the picture to the transmitted rays of white lights, we have a complete oriental scene with no portion of the modern city visible. This same method can be employed in having a blue sky and a green foreground and by painting behind the sky a red-yellow-purplish tone, grey the sky and paint the green with a purplish tone, which will grey it, creating thereby a thoroughly neutralized grey surface, and then bringing streaks of brilliant red and yellow and green from various positions in the picture to a central point, also painting a brilliant red sun, and, painting such shadows as would be appropriate, create a northern scene in which the ground would apparently be covered with snow, and the sky lighted with the brilliant rays of an aurora borealis appearing when subjected to the transmitted rays of white light.

This is a startling discovery, in that the teachings of all art and sciences heretofore have been that any color mixed with its complement must of a necessity turn grey or brown grey, but here I have the effect of a blue sky allowing red, yellow, green, orange, purple, or a darker shade of blue to appear through it without apparently dimming the power of any of the colors.

Figure 6:
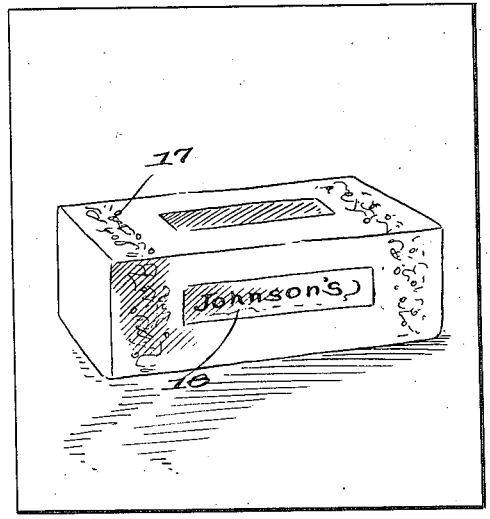

In Fig. 6, I show a package 17 labelled "Johnson's". The package is painted in pure yellow, the designs are painted in purple.

Figure 7:
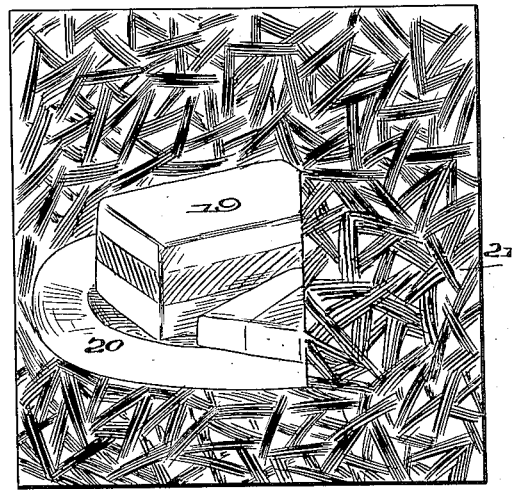

The panel 18 on which the name "Johnson's" appears is painted in blue, and the name Johnson's is in red. In Fig. 7, I show a plate of brick ice cream 9 in natural colors, chocolate, strawberry, and vanilla. The plate 20 is white with a blue green edge; and the background 21 in dark ultra-marine blue, for instance, or blue violet, done in a heavy brush stroke figure in the nature of a distorted plaid. Under the alternating flash of the transmitted rays of white light, we see, first the package with surrounding background of, for instance, pale blue, or lavender, and second the ice cream on the plate, the package having entirely disappeared. This is accomplished by giving no thought whatever to the color of the package, simply using a darker color and laying the broad brush strokes in such fashion and in such design as to entirely obliterate the design of the package and when subjected to the transmitted rays of white light the package will disappear and ice cream on the plate appear. This discovery is exceptionally interesting in the advertising world in that no distortion of the package is necessary for the front or daylight picture in order to produce the startling results when subjected to the transmitted rays of white light. The package may be in any desired color or combination of colors, but the background brush strokes must be of a much darker hue or of a direct complementary to the predominant color of the package.

In all these actions and changes of scenery, I do not confine my invention to any particular paint, ink, or other coloring substances. Neither do I confine my invention to any particular kind of material on which the displays are painted, printed, drawn, photographed, etc. I do not confine this invention to any color, for I have discovered that any color or shade, including black and white or any lead pencil, or crayon or pastel, or the like, may be used as a substitute for painting, printing, etc.

I claim:

1. The method of making advertising matter including illustrating an object on a side of a display surface to be viewed by reflected light, rendering said object invisible by transmitted light by coloring with transparent colors over the portion of the display surface corresponding to the object and behind the display surface, and superimposing a second object behind the display surface to be viewed by transmitted light.

2. The method of making advertising including illustrating an object on a side of a display surface to be viewed by reflected light, and rendering said object invisible by transmitted light by painting with transparent colors over a surface behind the display surface and the object and corresponding thereto by brush marks.

3. The method of making advertising including illustrating an object on a side of a display surface to be viewed by reflected light, and rendering said object invisible by transmitted light by painting with transparent colors over a surface behind the display surface and the object and corresponding thereto by heavy brush marks, and superimposing a second object over the latter to be viewed by transmitted light.

4. An advertising sign including a display surface having an object provided thereon, the corresponding portion behind the object being covered with transparent colors to render the object invisible by transmitted light, and providing a second object over the covering matter to be viewed by transmitted light.

5. The method of making advertising matter including illustrating an object or the like in transparent colors on the front side of a transparent or translucent display surface to be viewed by reflected light, then arranging transparent coloring matter of a complementary nature to the colors of the said object, on the back of the display surface and directly behind said object thereby causing it to fade out or disappear when viewed by transmitted light.

6. The method of making advertising matter including illustrating an object or the like on the front side of a transparent or translucent display surface to be viewed by reflected light, arranging transparent coloring matter of a complementary nature to the colors of the said object on the back of the same display surface, directly behind said object or a portion thereof, rendering said object, or a portion thereof, a neutral tonal grey and painting an object over the tonal grey thereby making the front object invisible and the back object visible by transmitted light.

7. The method of making advertising matter including illustrating an object or the like in transparent colors on the front side of a display surface to be viewed by reflected light and painting behind said object a series of fine brush strokes of variegated transparent colors or of one color of brilliant hue in fine brush strokes thereby rendering said object invisible by transmitted light.

8. The method of making advertising matter including illustrating an object or the like in transparent colors on the front side of a display surface to be viewed by reflected light, painting behind said object or a portion thereof a series of fine brush strokes of variegated transparent colors or of one color in fine brush strokes and over this kaleidoscopic effect painting an object thereby rendering the front object invisible and the back object visible by transmitted light.

9. The method of making advertising matter including illustrating an object or the like on the front side of a display surface to be viewed by reflected light, and painting behind the said object a series of wide brush strokes of one or more transparent colors in vivid hues and variegated designs, thereby rendering said object invisible when viewed by transmitted light.

10. The method of making advertising matter including illustrating an object or the like on a portion of the front side of a display surface to be viewed by reflected light and painting behind the object a series of wide brush strokes of one or more transparent colors in vivid hues and variegated designs, and painting the same or another object behind the display surface, thereby rendering the front object invisible and the back object visible when viewed by the rays of transmitted light, causing the objects to alternately appear when viewed alternately by the rays of reflected light and transmitted light.

11. The method of making advertising matter including illustrating an object or the like in transparent colors on a portion of the front side of a display surface to be viewed by reflected light and painting behind said object a series of fine brush strokes of variegated transparent colors or of one color of brilliant hue and painting the same or another object behind the display surface, thereby rendering the front object invisible and the back object visible when viewed by the rays of transmitted light, causing the objects to alternately appear when viewed alternately by the rays of reflected and transmitted light.

12. The method of making advertising matter including illustrating an object or the like in transparent colors on a portion of the front side of a display surface to be viewed by reflected light, then arranging transparent coloring matter of a complementary nature to the colors of the said object, behind the display surface and directly behind said object, and painting the same or another object on the back side of the display surface thereby rendering the front object invisible and the back object visible when viewed by the rays of transmitted light, causing the objects to alternately appear when viewed alternately by the rays of reflected and transmitted light.

13. The method of making advertising matter including illustrating an object or the like in transparent colors on a portion of the front side of a display surface to be viewed by reflected light and covering said object behind the same display surface with coloring matter, and treating the surrounding background in a like manner on the back of the same display surface, thereby making the entire display surface one complete tone or color when viewed by the rays of transmitted light.

14. The method of making advertising matter including illustrating an object or the like in transparent colors on the front side of a display surface to be viewed by reflected light, covering said object behind the same display surface with coloring matter and treating the surrounding background in a like manner on the back of the same display surface, thereby rendering the entire display surface one complete neutral tone or color when viewed by transmitted light, and painting over the back of said neutral tone or color another picture causing first one picture and then the other one to appear when viewed alternately by the rays of reflected and transmitted light.

In testimony whereof I affix my signature.

DURBIN C. HODGKIN.

CERTIFICATE OF CORRECTION.

Patent No. 1,880,202.    October 4, 1932.

DURBIN C. HODGKIN.

It is hereby certified that the above numbered patent was erroneously issued, to the inventor said "Hodgkin" and one-half interest to "Tom B. Owens, of Fort Worth, Texas," whereas said patent should have issued to the inventor said "Hodgkin", and one-fourth interest only to Tom B. Owens, of Fort Worth, Texas, as shown by the records of assignments in this office; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.